(12) United States Patent
Yamane et al.

(10) Patent No.: US 10,381,959 B2
(45) Date of Patent: Aug. 13, 2019

(54) MOTOR CONTROL DEVICE (71) Applicants: Taiki Yamane, Aichi (JP); Toshio Saito, Aichi (JP)

(72) Inventors: Taiki Yamane, Aichi (JP); Toshio Saito, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/455,252

(22) Filed: Mar. 10, 2017

(65) Prior Publication Data

US 2017/0331399 A1 Nov. 16, 2017

(30) Foreign Application Priority Data

May 12, 2016 (JP) .................. 2016-095897

(51) Int. Cl.
*H02P 6/12* (2006.01)
*H02P 6/06* (2006.01)
*H02P 29/024* (2016.01)

(52) U.S. Cl.
CPC .................. *H02P 6/12* (2013.01); *H02P 6/06* (2013.01); *H02P 29/0241* (2016.02)

(58) Field of Classification Search
CPC .... H02P 6/14; H02P 6/001; H02P 6/12; H02P 6/22; H02H 7/093
USPC .................................................. 318/400.21
See application file for complete search history.

(56) References Cited

U.S. PATENT DOCUMENTS

| 8,884,559 B2 | 11/2014 | Murata et al. | |
| 2014/0139158 A1* | 5/2014 | Tomita | B62D 5/0487 318/400.21 |
| 2017/0033724 A1* | 2/2017 | Kezobo | H02P 29/0241 |
| 2017/0264229 A1* | 9/2017 | Murata | H02P 27/08 |

FOREIGN PATENT DOCUMENTS

| JP | 2009-274686 A | 11/2009 |
| JP | 2011-155708 A | 8/2011 |
| JP | 2011-239489 A | 11/2011 |

* cited by examiner

*Primary Examiner* — Kawing Chan
*Assistant Examiner* — Bradley R Brown
(74) *Attorney, Agent, or Firm* — Osha Liang LLP (57) ABSTRACT

A motor control device includes: an inverter circuit including a semiconductor switching element for drive which drives a motor; a cut-off circuit including a semiconductor switching element for cut-off which cuts off an electric connection between the motor and the inverter circuit; a failure detection unit; a rotation number detection unit; and a control unit. In a case where the failure detection unit detects a failure of the semiconductor switching element for drive, the control unit turns off the semiconductor switching element for drive, and in a case where the number of rotations of the motor which is detected by the rotation number detection unit is less than a predetermined first threshold, the control unit further turns off the semiconductor switching element for cut-off.

5 Claims, 5 Drawing Sheets

MOTOR CONTROL DEVICE

CROSS-REFERENCE TO RELATED APPLICATION

This application is based upon and claims the benefit of priority from Japanese Patent Application No. 2016-095897, filed on May 12, 2016, the entire contents of which are incorporated herein by reference.

FIELD

One or more embodiments of the present invention relate to a motor control device, and particularly, to a motor control device which controls a motor by using an inverter circuit.

BACKGROUND

In the related art, a technology is known in which a countermeasure is considered when a switching element configuring an inverter circuit fails in a motor control device which controls a motor by using the inverter circuit. For example, JP-A-2011-155708 discloses a motor control device which aims to appropriately cut off a connection of a closed loop which is generated by a short-circuit failure of a switching element. The motor control device includes a motor, an inverter which drives the motor, a current cut-off mechanism which cuts off a connection between the motor and the inverter. In addition, the motor control device performs control of the motor which turns on all switching elements before cut-off of the current cut-off mechanism is performed, in a case where a current sensor senses a short-circuit failure of a high side switching element of the inverter.

In addition, JP-A-2009-274686 discloses an electric power steering device which aims to avoid that a closed circuit is formed and steering assist force or electromagnetic brake that a driver does not intend are generated, in a short time, in a case where an inverter operates abnormally and assist stops. The electric power steering device includes an inverter which calculates a current command value on the basis of at least steering torque and vehicle speed, and supplies a motor phase current to each phase of the motor that provides the steering assist force to a steering mechanism on the basis of the current command value. In addition, the electric power steering device is provided with a first FET group on each phase supply path through which the motor phase current is supplied to the motor, and turns off a second FET group and the first FET group which configure the inverter, when abnormality of the inverter is detected.

In addition, JP-A-2011-239489 discloses a motor drive device which aims to prevent a semiconductor switching element for fail safe from being broken down by a spike voltage by using simple circuit configuration and control operation. In a case where abnormality is detected, the motor drive device turns off all the respective semiconductor switching elements of an inverter circuit, and thereafter, turns off all the respective semiconductor switching elements of a fail safe circuit at a point of time when a predetermined time passes.

SUMMARY

In a case where a semiconductor switching element of an inverter circuit has a short-circuit failure, a motor control device which drives and controls a motor by using the inverter circuit has a closed loop of a current which is formed between the inverter circuit and the motor. In this case, in a case where a semiconductor switching element for current cut-off is turned off, a surge voltage may be generated and thereby, the semiconductor switching element may be broken down depending on a flowing current.

One or more embodiments of the invention provide a motor control device which drives and controls a motor by using an inverter circuit, and turns off the other semiconductor switching elements so as not to be broken down in a case where a semiconductor switching element of the inverter circuit fails.

In order to solve the above problems, there is provided a motor control device including an inverter circuit including a semiconductor switching element for drive which drives a motor; a cut-off circuit including a semiconductor switching element for cut-off which cuts off an electrical connection between the motor and the inverter circuit; a failure detection unit which detects a failure of the semiconductor switching element for drive; a rotation number detection unit which detects a number of rotations of the motor; and a control unit which controls the inverter circuit and the cut-off circuit. In a case where the failure detection unit detects a failure of the semiconductor switching element for drive, the control unit turns off the semiconductor switching element for drive, and in a case where the number of rotations of the motor which is detected by the rotation number detection unit is less than a predetermined first threshold, the control unit further turns off the semiconductor switching element for cut-off.

According to this, it is possible to provide a motor control device which turns off the other semiconductor switching elements so as not to be broken down, in a case where a semiconductor switching element of an inverter circuit fails.

Furthermore, in a case where the failure detection unit detects a short-circuit failure of the semiconductor switching element for drive, a control unit may turn off the semiconductor switching element for drive.

According to this, in a case where a short-circuit failure occurs in the semiconductor switching element of the inverter circuit, the other semiconductor switching elements can be turned off so as not to be broken down.

Furthermore, in a case where drive of the motor ends in a state where the failure detection unit does not detect a failure of the semiconductor switching element for drive, the control unit may turn off the semiconductor switching element for drive, and then turn off the semiconductor switching element for cut-off in a case where the number of rotations of the motor which is detected by the rotation number detection unit is less than a second threshold that is a value larger than the first threshold.

According to this, even in a case where a semiconductor switching element of an inverter circuit does not fail, a semiconductor switching element can be turned off so as not to be broken down rapidly by using an appropriate threshold.

According to one or more embodiments of the invention, it is possible to provide a motor control device which turns off the other semiconductor switching elements so as not to be broken down, in a case where a semiconductor switching element of an inverter circuit fails.

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments of the invention will be described with reference to the drawings.

First Embodiment

Figure 1:
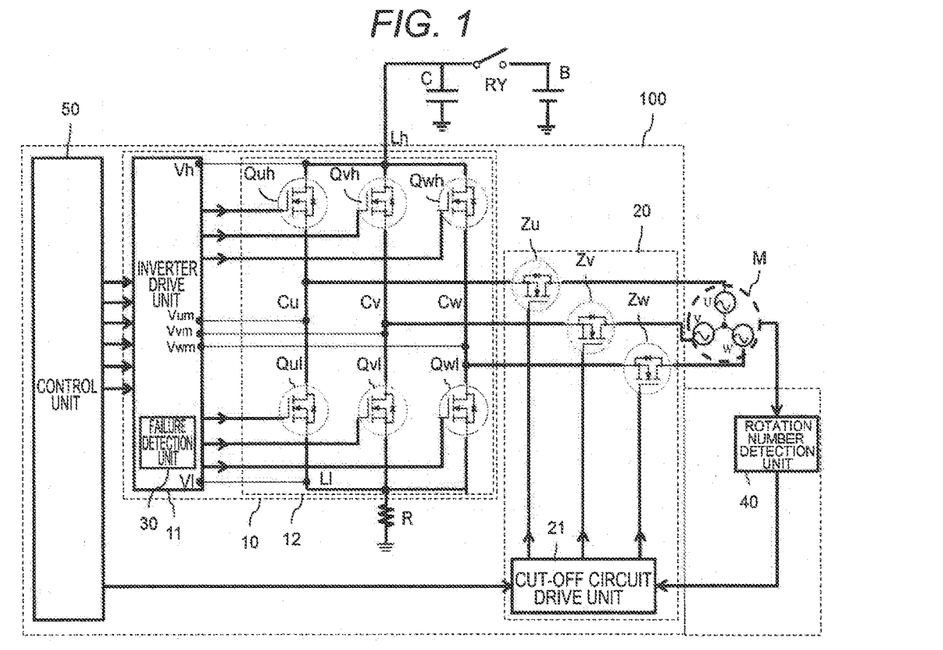
FIG. 1 is a block diagram illustrating a motor control device according to a first embodiment of the invention.

A motor control device 100 according to the present embodiment will be described with reference to FIG. 1. The motor control device 100 includes an inverter circuit 10 which drives a motor M, a cut-off circuit 20 which cuts off a connection between the motor M and the inverter circuit 10, a failure detection unit 30 which detects a failure of the inverter circuit 10, a rotation number detection unit 40 which detects the number of rotations of the motor M, and a control unit 50 which controls the inverter circuit 10 and the cut-off circuit 20. The motor control device 100 is a three-phase brushless motor which is used for a power steering device, a power sliding door (not illustrated), and the like of a vehicle, and drives and controls the three-phase motor M which provides assist force for a steering operation or the like.

The inverter circuit 10 includes a bridge circuit 12 which is configured by connecting in parallel each of phase circuits Cu/Cv/Cw corresponding to each of phases U/V/W of the motor M, and an inverter drive unit 11 which outputs pulse width modulation (PWM) signals to each phase of the bridge circuit 12. The inverter drive unit 11 is controlled by the control unit 50, and controls ON/OFF of the semiconductor switching elements for drive Quh to Qwl which drive the motor M, which are high side semiconductor switching elements Quh/Qvh/Qwh and low side semiconductor switching elements Qul/Qvl/Qwl. The inverter drive unit 11 calculates an appropriate duty ratio, based on a steering torque value of steering, a rotation angle of the motor M, and the like which are input from the control unit 50 and are obtained from other sensors or an electric control unit (ECU, not illustrated), and outputs the PWM signals. The PWM signals are respectively input to gates of the semiconductor switching elements for drive Quh to Qwl, and the bridge circuit 12 converts power of a battery B which functions as a DC power supply by using PWM control, and supplies the power to the motor M.

The bridge circuit 12 is connected to a positive electrode side of the battery B through a power supply line Lh, and is connected (grounded) to a negative electrode side of the battery B through a ground line Ll. The respective phase circuits Cu/Cv/Cw of the bridge circuit 12 have the high side semiconductor switching elements Quh/Qvh/Qwh which are provided on the power supply line Lh side, and the low side semiconductor switching elements Qul/Qvl/Qwl which are provided on the ground line Ll side in series. In the present embodiment, the high side semiconductor switching elements Quh/Qvh/Qwh and the low side semiconductor switching elements Qul/Qvl/Qwl use MOSFETs, that is, metal oxide semiconductor field effect transistors. A current detector R is provided on a ground side of the bridge circuit 12.

Drains of the high side semiconductor switching elements Quh/Qvh/Qwh are connected to the power supply line Lh. In addition, sources of the high side semiconductor switching elements Quh/Qvh/Qwh are connected to drains of the low side semiconductor switching elements Qul/Qvl/Qwl. Sources of the low side semiconductor switching elements Qul/Qvl/Qwl are connected to the ground line Ll. The high side semiconductor switching elements Quh/Qvh/Qwh and the low side semiconductor switching elements Qul/Qvl/Qwl have gates to which the PWM signals which are generated by the inverter drive unit 11 are input, and the drains and the sources thereof are connected to or disconnected from each other.

Connection points between the high side semiconductor switching elements Quh/Qvh/Qwh and the low side semiconductor switching elements Qul/Qvl/Qwl are respectively connected to the phases U/V/W of the motor M through the cut-off circuit 20. The cut-off circuit 20 includes semiconductor switching elements for cut-off Zu/Zv/Zw, and a cut-off circuit drive unit 21 which controls ON/OFF of the semiconductor switching elements for cut-off Zu/Zv/Zw in response to control signals from the control unit 50. The semiconductor switching elements for cut-off Zu/Zv/Zw have sources connected to the connection points between the high side semiconductor switching elements Quh/Qvh/Qwh and the low side semiconductor switching elements Qul/Qvl/Qwl of the respective phase circuits Cu/Cv/Cw, and have drains connected to the respective phase circuits Cu/Cv/Cw of the motor M. Hence, the cut-off circuit drive unit 21 connects each phase of the inverter circuit to each phase of the motor M, or disconnects each phase of the inverter circuit from each phase of the motor M, according to the control. In the present embodiment, three semiconductor switching elements for cut-off are included, but the motor M can be connected by turning on at least two semiconductor switching elements for cut-off at one point of time, and thus, at least two semiconductor switching elements for cut-off may be included.

The failure detection unit 30 detects voltages of the respective points in the respective phase circuits Cu/Cv/Cw, thereby, detecting failures of the semiconductor switching elements for drive Quh to Qwl. In the present embodiment, the failure detection unit 30 is provided in the inverter drive unit 11. The inverter drive unit 11 includes a power supply line detection terminal Vh through which the inverter drive unit 11 detects a voltage of the power supply line Lh, a ground line detection terminal Vl through which the inverter drive unit detects a voltage of the ground line Ll, and intermediate voltage detection terminals Vum/Vvm/Vwm through which the inverter drive unit detects intermediate voltages of each phase at the connection points between the high side semiconductor switching elements Quh/Qvh/Qwh and the low side semiconductor switching elements Qul/Qvl/Qwl, for the failure detection unit 30. By detecting voltages of each point at each terminal, a difference between voltages of the respective phase circuits Cu/Cv/Cw can be detected, and thereby, it is possible to detect failures of the semiconductor switching elements for drive Quh to Qwl occurring between the respective points.

For example, if a voltage detected at the intermediate voltage detection terminal Vum of the phase circuit Cu is approximately the same as a voltage detected at the power supply line detection terminal Vh although the inverter drive unit 11 turns off the semiconductor switching element for drive Quh, the failure detection unit 30 can determine that the semiconductor switching element for drive Quh is short-circuited. In addition, in the same manner, if the voltage detected at the intermediate voltage detection terminal Vum of the phase circuit Cu is significantly different from the voltage detected at the power supply line detection terminal Vh although the inverter drive unit 11 turns on the semiconductor switching element for drive Quh, the failure detection unit 30 can determine that the semiconductor switching element for drive Quh is disconnected.

The rotation number detection unit 40 may detect the number of rotations of the motor M by using a known method. The rotation number detection unit 40 transmits the number of rotations which is detected to the cut-off circuit drive unit 21. As described above, the control unit 50 controls the semiconductor switching elements for drive Quh to Qwl through the inverter drive unit 11, based on information which is obtained from other sensors or an ECU. Furthermore, together with this, the control unit 50 controls the semiconductor switching elements for drive Quh to Qwl through the inverter drive unit 11, based on the failure information that the failure detection unit 30 detects, and controls the semiconductor switching elements for cut-off Zu to Zw through the cut-off circuit drive unit 21, as will be described below. The control unit 50 is configured with a microcontroller which includes a CPU and a memory.

Figure 2:
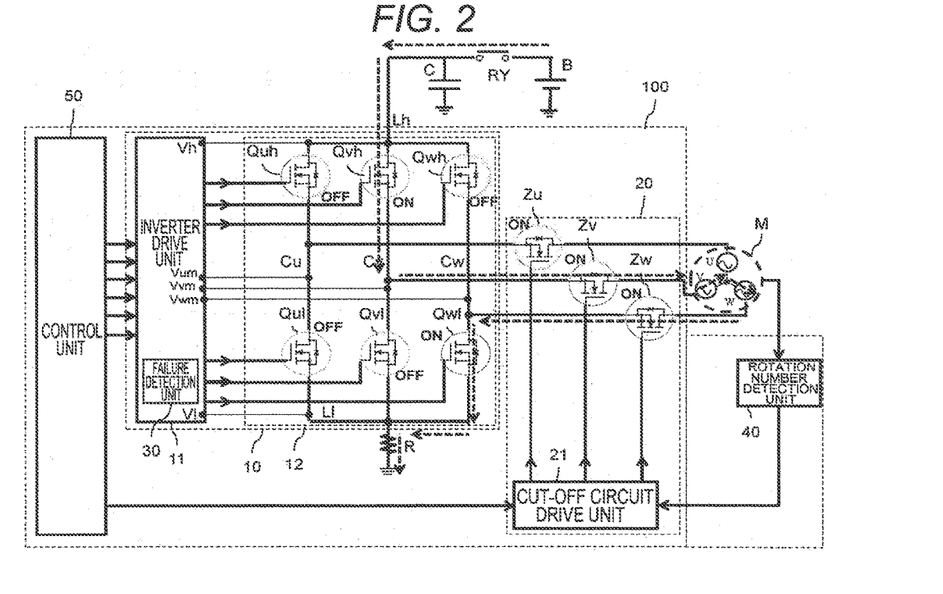
FIG. 2 is an explanatory diagram illustrating a flow of a current in a case where the motor control device according to the first embodiment of the invention performs a normal operation.

A control method of the respective semiconductor switching elements in the motor control device 100 will be described with reference to FIGS. 2 to 6. FIG. 2 illustrates a flow (dotted line) of a current in a case where the semiconductor switching element for drive Qvh and the semiconductor switching element for drive Qwl are turned on and the other semiconductor switching elements for drive are turned off, in a case where the motor control device 100 performs a normal operation. Since it is a case where a normal operation is performed, the semiconductor switching elements for cut-off Zu to Zw are all turned on.

If a relay RY is turned on, a current starts to flow through the bridge circuit 12 through the power supply line Lh from the battery B. Since the semiconductor switching element for drive Qvh is turned on among the high side semiconductor switching elements Quh/Qvh/Qwh, a current flows through the phase circuit Cv. In addition, since the semiconductor switching element for drive Qwl is turned on among the low side semiconductor switching elements Qul/Qvl/Qwl, a current flows to a W phase from a V phase of the motor M, and flows to the ground through the semiconductor switching element for drive Qwl and the ground line Ll.

In this case, although the amount of dropped voltages of the semiconductor switching element for drive Qvh is added, a voltage which is detected at the intermediate voltage detection terminal Vvm is approximately the same as a voltage which is detected at the power supply line detection terminal Vh. In addition, for example, since the semiconductor switching element for drive Quh is turned off, a voltage which is detected at the intermediate voltage detection terminal Vum is lower than the voltage which is detected at the power supply line detection terminal Vh.

Figure 3:
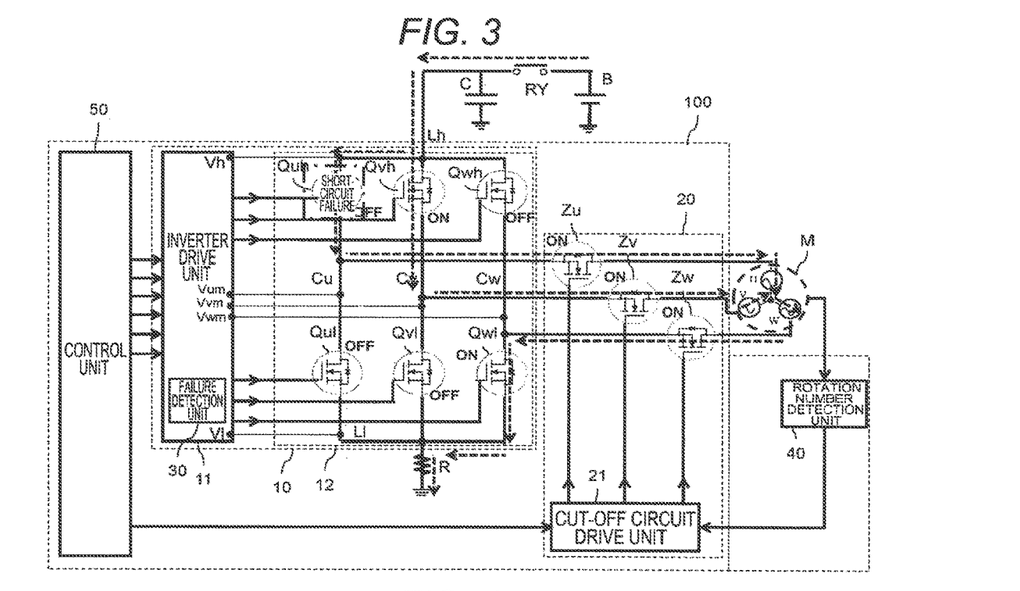
FIG. 3 is an explanatory diagram illustrating a case where a short-circuit failure occurs in a case where the motor control device according to the first embodiment of the invention performs a normal operation.

In this state, a case where the semiconductor switching element for drive Quh is short-circuited is illustrated in FIG. 3. If a short-circuit failure illustrated in this figure occurs, a current flows through the semiconductor switching element for drive Quh, the voltage which is detected at the intermediate voltage detection terminal Vum becomes the voltage that is approximately the same as the voltage which is detected at the power supply line detection terminal Vh. However, the control unit 50 turns off the semiconductor switching element for drive Quh, and thus, the failure detection unit 30 detects that a short-circuit failure occurs in the semiconductor switching element for drive Quh, as the voltage of the intermediate voltage detection terminal Vum is approximately the same as the voltage of the power supply line detection terminal Vh.

Figure 4:
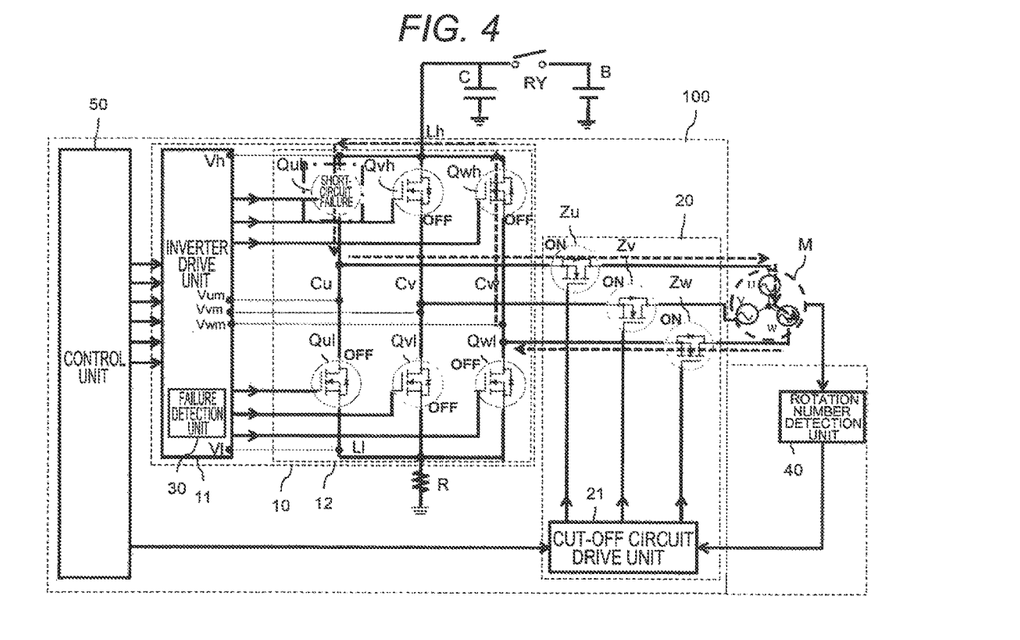
FIG. 4 is an explanatory diagram illustrating a flow of a current in a case where a semiconductor switching element for drive of an inverter circuit is turned off in a case where the short-circuit failure occurs in the motor control device according to the first embodiment of the invention.

If the failure detection unit 30 detects a failure of any one of the semiconductor switching elements for drive Quh to Qwl, the control unit 50 turns off all the semiconductor switching elements for drive Quh to Qwl so as to stop an operation of the motor M by considering safety. In addition, since the relay RY is also open, the motor control device 100 is electrically separated from the battery B. FIG. 4 illustrates this state. In this state, a closed circuit is formed between the bridge circuit 12 and the motor M. The present figure illustrates a state where a close circuit is formed between the U phase and the W phase of the motor M and the bridge circuit 12.

Figure 5:
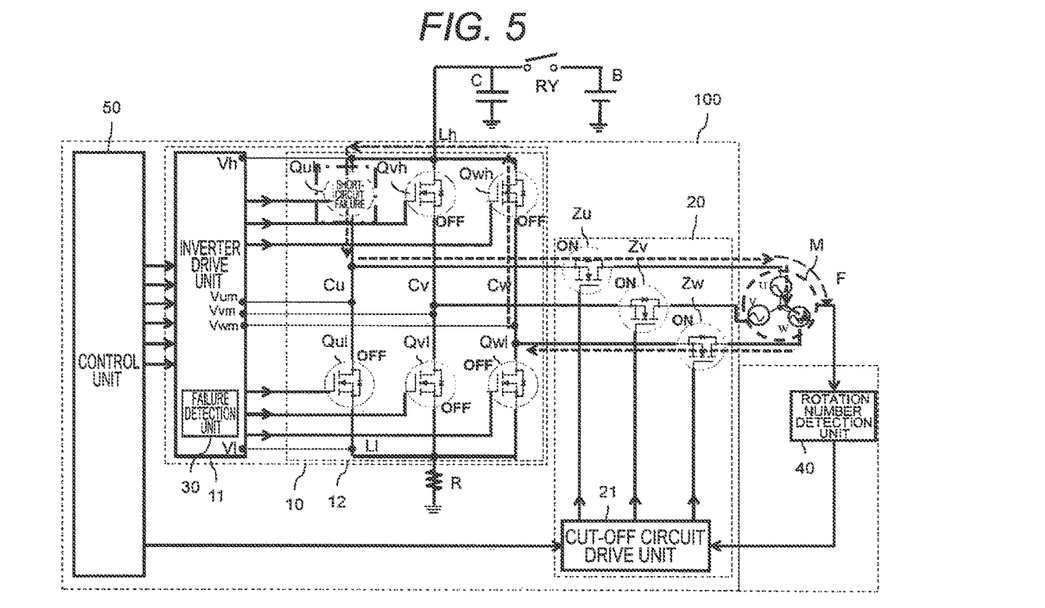
FIG. 5 is an explanatory diagram illustrating a case where a motor is manually rotated in a case where the semiconductor switching element for drive of the inverter circuit is turned off, and in a case where the short-circuit failure occurs in the motor control device according to the first embodiment of the invention.

In this case, the closed circuit is formed by the semiconductor switching element for drive Quh which is short-circuited in the phase circuit Cu, the semiconductor switching element for cut-off Zu, the U phase and the W phase of the motor M, the semiconductor switching element for cut-off Zw, a parasitic diode in the semiconductor switching element for drive Qwh in the phase circuit Cw, the power supply line Lh, and the semiconductor switching element for drive Quh. In the closed circuit, if a current is cut off in a case where the number of rotations of the motor M increases, a surge current is generated, and thereby, there is a case where the semiconductor switching element is broken down depending on a flowing current. In addition, as illustrated in FIG. 5, in a case where a handle, a slide door, or the like that the motor M drives is operated by a person and thereby external force F is added to the motor M, there is a case where a current flowing through the closed circuit further increases. In this case, if the current is cut off, there is a high possibility that the semiconductor switching element is further broken down.

Figure 6:
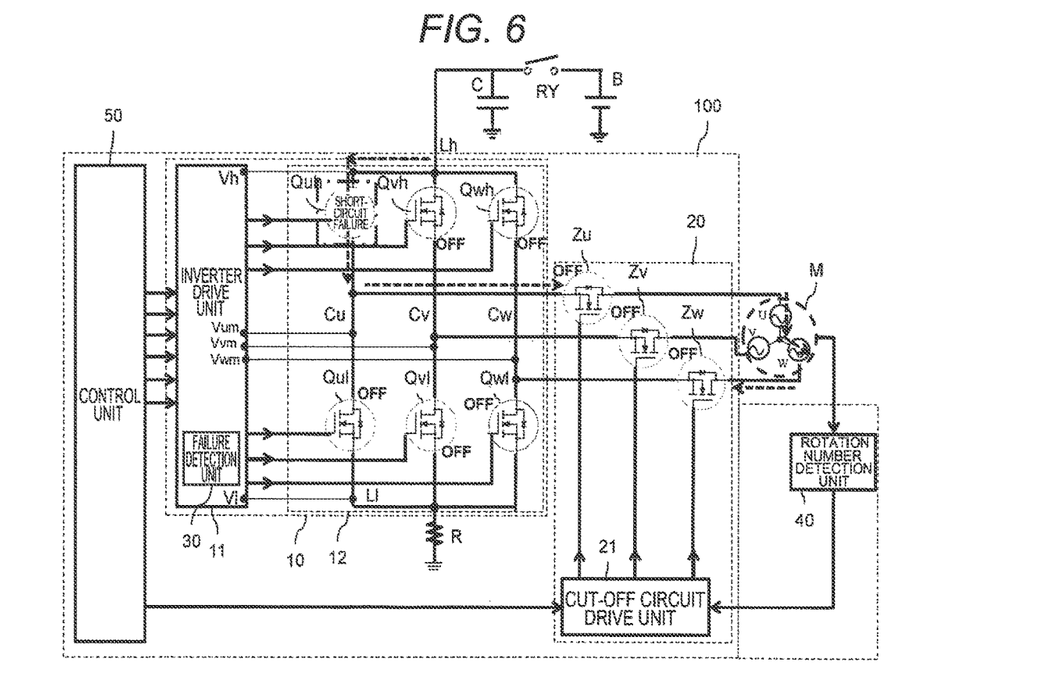
FIG. 6 is an explanatory diagram illustrating a case where a semiconductor switching element for cut-off of the inverter circuit is turned off in a case where the short-circuit failure occurs in the motor control device according to the first embodiment of the invention.

However, if the number of rotation of the motor M decreases, the current flowing through the closed circuit also decreases, and thus, the semiconductor switching element is not broken down. Accordingly, after the semiconductor switching elements for drive Quh to Qwl are turned off and thereby the closed circuit is formed, in a case where the number of rotation of the motor M which is detected by the rotation number detection unit 40 is less than a predetermined threshold (first threshold), the control unit 50 turns off the semiconductor switching elements for cut-off Zu to Zw as illustrated in FIG. 6. The predetermined threshold (first threshold) is a value by which the semiconductor switching element is not broken down when the number of rotations is less than the value and which is confirmed in advance to be set. If doing so, a current flows in accordance with counter electromotive force or the like of the motor M (dotted line), but although the formed closed circuit is cut off by the semiconductor switching elements for cut-off Zu/Zw, a voltage which is generated by the counter electromotive force also does not increase if the number of rotation is less than the predetermined threshold, and thus, even if the surge voltage is generated, the semiconductor switching element is not broken down.

Accordingly, in a case where any one of the semiconductor switching elements for drive Quh to Qwl of the inverter circuit 10 fails, the semiconductor switching elements for drive Quh to Qwl are turned off, and thereafter, if the semiconductor switching elements for cut-off Zu to Zw are turned off in a case where the number of rotations of the motor M which is detected by the rotation number detection unit 40 is less than the predetermined first threshold, the semiconductor switching element is not broken down.

An example in which the short-circuit failure occurs is described in the present embodiment, but, even in a case where an open failure occurs, the control unit 50 performs the control in the same manner. Because, in a case where the number of rotations of the motor M is high, counter electromotive force also increases due to this, a current flowing through the bridge circuit 12 increases, and thus, there may be a case where a semiconductor switching element is broken down. In addition, a case where the U phase and the W phase become a current path is described above, but a case where the W phase and the V phase, and the U phase and the V phase become current paths is also the same as above.

Figure 7:
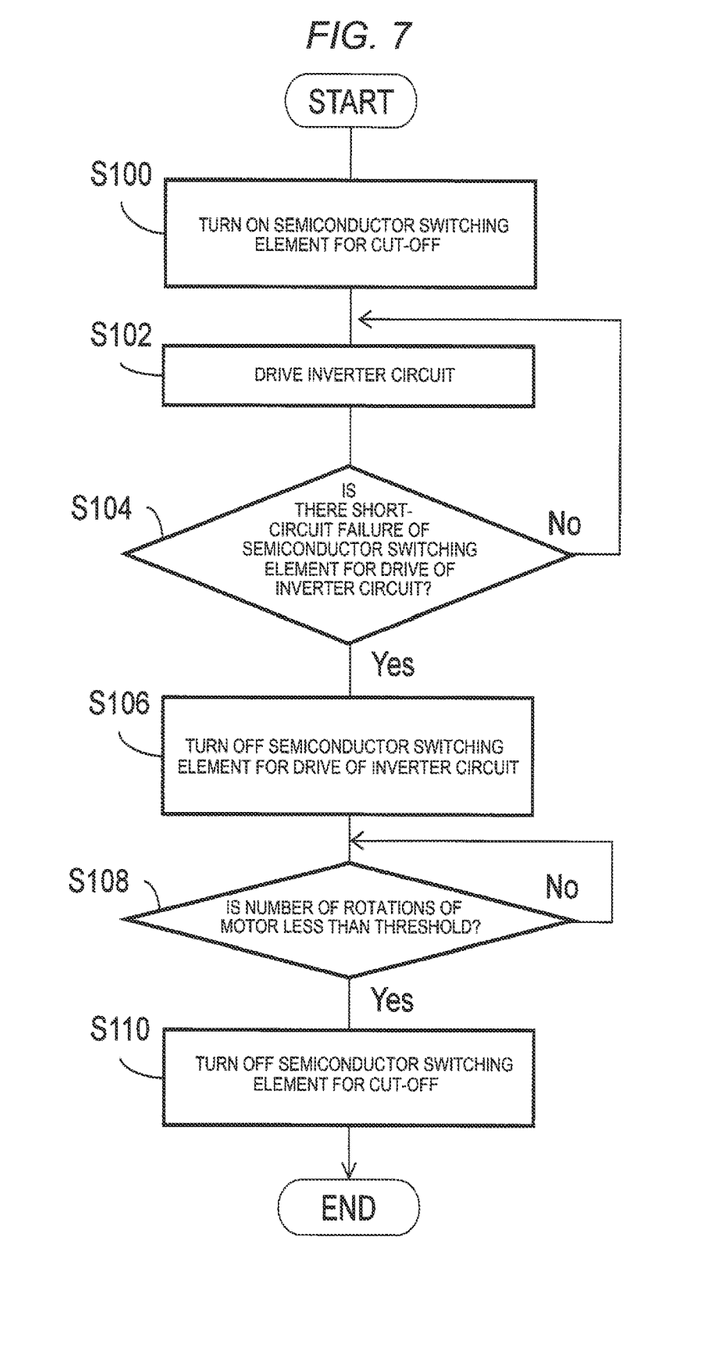
FIG. 7 is a flowchart illustrating a control method of the motor control device according to the first embodiment of the invention.

A control method of the motor control device 100 will be described with reference to FIG. 7. S described in the flowchart means a step. In S100, the cut-off circuit drive unit 21 turns on the semiconductor switching elements for cut-off Zu to Zw in response to control signals from the control unit 50, and prepares drive of the motor M. In addition, in S102, the inverter drive unit 11 drives the respective semiconductor switching elements for drive Quh to Qwl of the bridge circuit 12 in response to the control signals of the control unit 50, and thereby, the motor M rotates.

In S104, when the inverter drive unit 11 starts to drive the bridge circuit 12, the failure detection unit 30 detects voltages at the intermediate voltage detection terminals Vum/Vvm/Vwm and the like, and inspects whether or not a short-circuit failure occurs in any one of the semiconductor switching elements for drive Quh to Qwl. If there is no failure, the motor control device 100 repeats S102 and S104 as a so-called normal time.

In S106, in a case where a short-circuit failure occurs in any one of the semiconductor switching elements for drive Quh to Qwl, the inverter drive unit 11 turns off all the respective semiconductor switching elements for drive Quh to Qwl of the bridge circuit 12 in response to the control signals of the control unit 50. Subsequently, in S108, the rotation number detection unit 40 detects the number of rotations of the motor M, inspects whether or not the number of rotations is less than a predetermined threshold (first threshold), and, when the number of rotations is larger than or equal to the predetermined threshold, waits until the number of rotations is less than the threshold.

In S110, in a case where the number of rotations of the motor M which is detected by the rotation number detection unit 40 is less than the predetermined threshold, that is, in a case where a voltage is used here by which the semiconductor switching element is not broken down although the semiconductor switching element for cut-off is turned off, the cut-off circuit drive unit 21 turns off the semiconductor switching elements for cut-off Zu to Zw in response to the control signals of the control unit 50, and thereby, the drive of the motor M is completely stopped. According to this, it is possible to provide the motor control device 100 which turns off the other semiconductor switching elements so as not to be broken down in a case where any one of the semiconductor switching elements for drive Quh to Qwl of the inverter circuit 10 is broken down.

Figure 8:
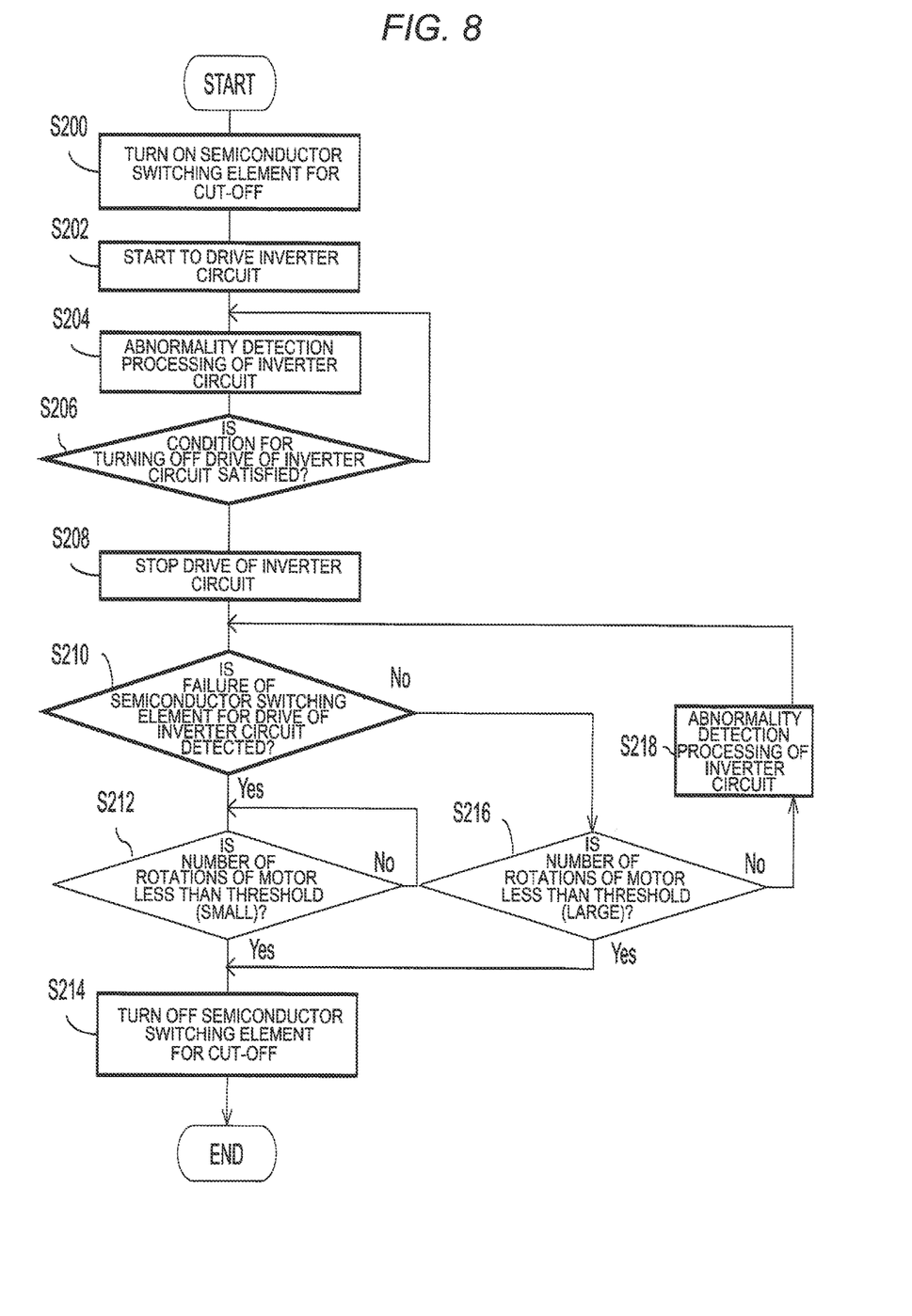
FIG. 8 is a flowchart illustrating a control method of a motor control device according to a modification example of the first embodiment of the invention.

In addition, even in a case where the drive of the motor M ends at a normal time when a failure does not occur, the motor control device 100 can perform the control in the same manner, as illustrated in FIG. 8. In S200, the cut-off circuit drive unit 21 turns on the semiconductor switching elements for cut-off Zu to Zw in response to the control signals of the control unit 50, and prepares drive of the motor M. In addition, in S202, the inverter drive unit 11 starts to drive the respective semiconductor switching elements for drive Quh to Qwl of the bridge circuit 12 in response to the control signals of the control unit 50, and thereby, the motor M starts to rotate.

In S204, when the inverter drive unit 11 starts to drive the bridge circuit 12, the failure detection unit 30 performs abnormality detection processing of detecting voltages of the intermediate voltage detection terminals Vum/Vvm/Vwm and the like so as to inspect whether or not a failure occurs in any one of the semiconductor switching elements for drive Quh to Qwl. In S206, the control unit 50 inspects whether or not drive of the inverter drive unit 11 may be ended to stop. Here, a case where the drive of the inverter drive unit 11 may be ended includes a case where the failure detection unit 30 detects that a failure occurs in any one of the semiconductor switching elements for drive Quh to Qwl in S204, a case where the control unit 50 ends the drive of the motor M in a normal state such as turning off ignition, or the like.

In step S206, in a case where the control unit 50 may not end the drive of the inverter drive unit 11, the motor control device 100 repeats S204 to S206 as a so-called normal time. In S208, in a case where a failure occurs in any one of the semiconductor switching elements for drive Quh to Qwl, or in a case where the drive of the motor M ends in a normal state, the inverter drive unit 11 turns off all the respective semiconductor switching elements for drive Quh to Qwl of the bridge circuit 12 in response to the control signals of the control unit 50, and thereby, the drive stops.

In S210, the control unit 50 inspects the reason that the drive of the inverter drive unit 11 is ended, such as a case where a failure occurs in any one of the semiconductor switching elements for drive Quh to Qwl, or a case where the drive of the motor M ends in a normal state. The reason is the case where a failure occurs in any one of the semiconductor switching elements for drive Quh to Qwl, the rotation number detection unit 40 detects the number of rotations of the motor M, inspects whether or not the number of rotations is less than the predetermined threshold (first threshold), and, in a case where the number of rotations is larger than or equal to the threshold, waits until the number of rotations is less than the threshold, in S212.

In addition, in S216, in a case where the reason is that the drive of the motor M ends in a normal state, the rotation number detection unit 40 detects the number of rotations of the motor M, and inspects whether or not the number of rotations is less than a predetermined threshold (second threshold). In addition, in S218, in a case where the number of rotations is larger than or equal to the predetermined threshold, the failure detection unit 30 detects the voltages of the intermediate voltage detection terminals Vum/Vvm/Vwm and the like so as to inspect whether or not a failure occurs in any one of the semiconductor switching elements for drive Quh to Qwl, returns to S210, and inspects why the drive of the inverter drive unit 11 is ended again for any reason. Thereby, the drive of the motor M can be stopped at an early stage, in a case where a failure occurs although the motor M rotates at a high speed.

The predetermined threshold (second threshold) in a case where the drive of the motor M ends in a normal state is greater than the predetermined threshold (first threshold) in a case where a failure occurs in any one of the semiconductor switching elements for drive Quh to Qwl. This is because the semiconductor switching element is not broken down although the semiconductor switching elements for cut-off Zu to Zw are turned off at the time of relatively high number of rotations, since the counter electromotive force can be absorbed by the bridge circuit 12 at a high rate in a case where the bridge circuit 12 ends the drive of the motor M in a normal state.

In addition, in S214, in a case where the number of rotations is less than a threshold, based on the threshold of the number of rotations of the motor M suitable for any one of a case where a failure occurs or a case where the drive ends in a normal state, the cut-off circuit drive unit 21 turns off the semiconductor switching elements for cut-off Zu to Zw in response to the control signals of the control unit 50, and thereby, the drive of the motor M is completely stopped. That is, in a case where the drive of the motor M ends even in a case where the failure detection unit 30 does not detect the failure of the semiconductor switching elements for drive Quh to Qwl, the control unit 50 turns off the semiconductor switching elements for drive Quh to Qwl, and thereafter turns off the semiconductor switching elements for cut-off Zu to Zw in a case where the number of rotations of the motor M which is detected by the rotation number detection unit 40 is less than the second threshold larger than the first threshold. According to this, it is possible to turn off the semiconductor switching elements such that the semiconductor switching element are not broken more rapidly by using an appropriate threshold even in a case where a failure does not occur in the semiconductor switching elements for drive Quh to Qwl of the inverter circuit 10.

The invention in not limited to the exemplified embodiments, and can be realized by a configuration in a range without departing from the contents described in each item in the scope of claims. That is, the invention is particularly illustrated and described with respect to mainly specific embodiments, but those skilled in the art can variously modify quantity and other detailed configurations in the aforementioned embodiments, without departing from a range of the technical spirit and the objects of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A motor control device comprising:
   an inverter circuit comprising a plurality of semiconductor switching elements for drive that drive a motor;
   a cut-off circuit comprising a plurality of semiconductor switching elements for cut-off that cut off an electric connection between the motor and the inverter circuit;
   a failure detection unit that detects a failure of at least one of the plurality of semiconductor switching elements for drive;
   a rotation number detection unit that detects a number of rotations of the motor; and
   a control unit that controls the inverter circuit and the cut-off circuit,
   wherein if the failure detection unit detects the failure of at least one of the plurality of semiconductor switching elements for drive of the inverter circuit, the control unit turns off all of the plurality of semiconductor switching elements for drive of the inverter circuit, and subsequently, the rotation number detection unit detects the number of rotations of the motor, and if the number of rotations is larger than or equal to a first threshold, the control unit waits until the number of rotation is less than the first threshold, and if the number of rotations of the motor which is detected by the rotation number detection unit is less than the first threshold, the control unit further turns off all of the plurality of semiconductor switching elements for cut-off of the cut-off circuit, and
   wherein the first threshold is a value by which the plurality of semiconductor switching elements for the drive of the inverter circuit are not broken down by a voltage which is generated by a counter electromotive force when the number of rotations is less than the value and which is confirmed in advance to be set.

2. The motor control device according to claim 1, wherein if the failure detection unit detects a short-circuit failure of at least one of the plurality of semiconductor switching elements for drive, the control unit turns off all of the plurality of semiconductor switching elements for drive.

3. The motor control device according to claim 1, wherein if drive of the motor ends in a state where the failure detection unit does not detect a failure of at least one of the plurality of semiconductor switching elements for drive, the control unit turns off all of the plurality of semiconductor switching elements for drive, and then turns off all of the plurality of semiconductor switching elements for cut-off if the number of rotations of the motor which is detected by the rotation number detection unit is less than a second threshold that is a value larger than the first threshold.

4. The motor control device according to claim 2, wherein if drive of the motor ends in a state where the failure detection unit does not detect a failure of at least one of the plurality of semiconductor switching elements for drive, the control unit turns off all of the plurality of semiconductor switching elements for drive, and then turns off all of the plurality of semiconductor switching elements for cut-off if the number of rotations of the motor which is detected by the rotation number detection unit is less than a second threshold that is a value larger than the first threshold.

5. The motor control device according to claim 1,
   wherein the motor comprises a three-phase motor that is driven by the plurality of semiconductor switching elements for drive, and wherein the plurality of semiconductor switching elements for cut-off cut off the electric connection between respective phases of the three-phase motor and the inverter circuit.

* * * * *